United States Patent [19]

Walter et al.

[11] 4,253,694
[45] Mar. 3, 1981

[54] PICK-UP DEVICE FOR ROUND PRODUCTS

[75] Inventors: Hermann Walter, Hirschberg; Georg Fröhlich, Birkenau, both of Fed. Rep. of Germany

[73] Assignee: Firma Carl Freudenberg, Weinheim, Fed. Rep. of Germany

[21] Appl. No.: 76,382

[22] Filed: Sep. 17, 1979

[30] Foreign Application Priority Data

Oct. 16, 1978 [DE] Fed. Rep. of Germany ....... 2845056

[51] Int. Cl.³ .............................................. B66C 1/46
[52] U.S. Cl. ....................................................... 294/93
[58] Field of Search .................... 294/93, 86.24, 86.25, 294/86.32, 99 R, 86 R, 80; 279/2, 1 Q, 96, 102; 269/48.1; 166/196

[56] References Cited

U.S. PATENT DOCUMENTS 3,166,335  1/1965  Mason ................................. 294/93
3,233,315  2/1966  Levake ............................... 294/93

Primary Examiner—James B. Marbert
Attorney, Agent, or Firm—Kenyon & Kenyon

[57] ABSTRACT

A pick-up device for products having round portions which can be gripped frictionally, ranging from heavy metal products having bores or round holes to thin-walled drinking glasses having round peripheries, has a cylindrical part which can be positioned radially opposite to the round portion, either by insertion or encirclement, and having a circumferential groove radially facing the portion. A cylindrical elastic elastomer ring is positioned loosely in the groove and has axially extending lip seals slidably engaging the groove's sides. Fluid pressure introduced to the groove behind the ring causes the ring to elastically deform towards and frictionally grip the round portion of the product to be picked up, and by the resiliency of the ring, to release the portion when the pressure is terminated.

5 Claims, 2 Drawing Figures

PICK-UP DEVICE FOR ROUND PRODUCTS

BACKGROUND OF THE INVENTION

There are prior art devices for picking up and transporting products having round portions externally or internally which can be mechanically gripped. Engagement solely by friction is required to avoid damage to the product. Therefore, fingers having a coating of an elastomer such as rubber are used, and they require relatively complicated actuating equipment, particularly if uniform finger pressure is required. Such device are sensitive to wear and relatively fragile with improper handling, and they can be repaired only at substantial expense and by using skilled labor.

The object of this invention has been to provide a pick-up device for such products, which provides an always adequate gripping force of uniform pressure throughout, and which is simple, rugged, and capable of being repaired by unskilled labor.

EXPLANATION OF THE INVENTION

The invention achieves the above object by providing a pick-up device for any product having a round portion, internally or externally, the device comprising a pick-up body having a cylindrical part adapted to be positioned radially opposite to the product's round portion, either by insertion or encirclement as the case may be. This cylindrical part has a circumferential groove positioned to radially face the round portion, this groove having substantially flat and mutually parallel sides, the latter being at right angles to the part's axis.

A cylindrical elastic elastomer ring is positioned loosely in that groove and the ring has axially extending lip seals slidably engaging the groove's sides. The cylindrical pick-up part has a conduit for pressurized fluid, such as compressed air, and which leads to the groove behind the ring so that the fluid causes the ring to move elastically towards and frictionally grip the round portion of the product to be picked up. The ring has flat mutually parallel axial ends loosely fitting the groove's sides and the ring's side facing the groove's bottom is formed with a circular depression having beveled sides flaring towards the groove's bottom. The lip seals, preferably integral parts of the elastomer ring, axially extend from the ring's ends at positions axially opposite to the depressions flaring sides which may merge with the rings sides to form sharp corners.

The bottom of the ring's depression is flat and has an axial extent of at least 50% of the ring's axial length or, in other words, the flaring or beveled sides of the depression should not have an axial extent of more than 50% of the ring's axial length. The ring's axial length can be from 0.8 to 3 times the radial wall thickness of the ring between its depression's flat bottom and the ring's opposite side or gripping side.

The pick-up body, including its cylindrical part, can be made of metal such as steel. The elastomer ring can be made of any elastomeric material, such as rubber, compounded to have the degree of elastic deformability required for the handling of the particular product to be picked up. For example, in the case of a heavy metal part, the elastomer can have sufficient resistance to elastic deformation and the necessary toughness required. Contrastingly, if glassware such as thin-walled crystal drinking glasses represent the products to be picked up and handled, the elastomer ring can be made to have substantially less resistance to elastic deformation and being soft to a degree avoiding breakage of such delicate products.

Such a large range in the possible value of the modulus of elasticity of the elastomer ring is made possible because the ring can slide loosely in the groove while the lip seals provide effective sealing, the sealing pressure becoming greater by the pressurized fluid causing axial expansion of the ends of the ring around the flared side of the ring's depression where the elastomeric material is of reduced cross-sectional area. Also, this construction results in the ring having its greatest wall thickness at its ends, the wall thickness reducing between these ends so that the ring can have the flexibility required to conform to non-uniform round portions of a product such as manually blown crystal drinking glasses, when using an elastomer of suitable softness. At the same time, this new device is equally effective when handling heavy parts made of metal. As a generality, under average conditions it is suggested that the elastomer have a Shore hardness of at least 70 Shore A.

Frictional resistance between the radially sliding elastomer ring and the sides of the slot of the metal pick-up body part, is caused only by the lip seals which can be pressed against the slot's sides by the pressurized fluid behind the ring and due to the latter having what are, in effect, radially extending skirts having insides which convergingly angle towards the groove's bottom and which are the result of the depression and its flaring sides.

The simplicity of this new device is apparent. Under some prolonged service conditions, it is possible for the elastomer ring to wear and require replacement. Because of its cross-sectional contour and, therefore, elastic deformability, the ring can with force be elastically deformed so as to permit its removal from the groove in which it works. A similar ring can then with force be installed in the groove. Skilled labor is not required.

When the character of the product to be picked up requires it, a multiplicity of the slots and rings can be used, with the pressurized fluid being fed to the slots and behind the rings by one or more conduits connecting the spaces behind the various rings for parallel operation so that the pressure behind all of the rings is the same and the product's round portion is gripped with a uniform pressure at all places.

Examples of the invention are illustrated by the accompanying drawings, and hereinafter described in detail.

DETAILED DESCRIPTION OF THE DRAWINGS

Figure 1:
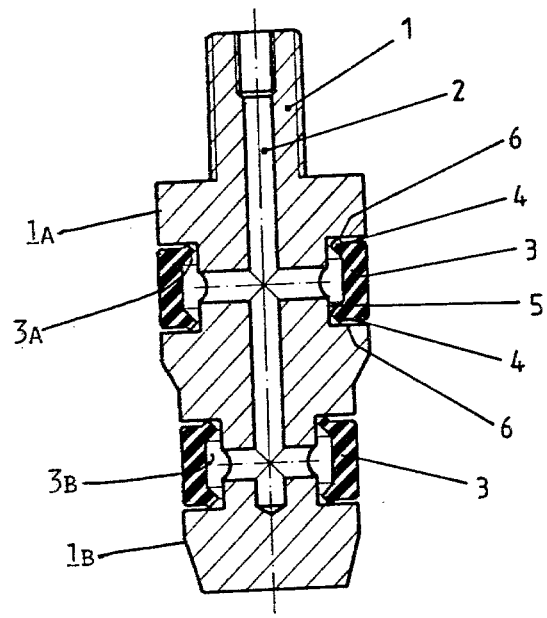
FIG. 1 is a longitudinal section showing an example of the device when designed for use in a hole in the product to be picked up, and when using two of the slots and rings and with the cylindrical part having differing diameters such as might be required to pick up a relatively heavy metal product having a round bore and counterbore.

Having reference to those drawings, a metal pick-up body 1 is shown as having a larger diameter cylindrical part 1a and a smaller diameter cylindrical part 1b, the body having a pressurized fluid conduit 2 running through it axially and branching off to feed the inner sides of two of the cylindrical elastomer rings 3 having the lip seals 4 slidably bearing against the groove sides 6, when the pressurized fluid is introduced to the spaces 5 formed behind the rings, as previously explained.

In this case the lip seals are in the form of axially extending annular beads surrounding the ring skirts formed by the flaring or beveled sides 3a of the depressions 3b formed in the insides of the rings. These sides which flare or are beveled can have angularities ranging from 45° to 80° with respect to the common axis of the parts 1a and 1b, and the bottoms 3b of the depressions, which are circular, should have lengths more than 50% of the lengths of the rings 3.

This form of the device can be used, for example, in the case of a metal product having a bore and counterbore respectively loosely fitted by the differently diametered pick-up body's cylindrical portions. In such a case the elastomeric material from which the rings and the sealing beads 4 are formed integrally, may have a Shore hardness of at least 70 Shore A.

Assuming the device of FIG. 1 is inserted in such a bore hole, pressurized fluid introduced to the conduit 2 could be provided by the usual shop air pressure system having an operating pressure characteristically in the area of 6 kg/cm$^2$. This would push out the rings 3 which would elastically expand circumferentially and grip the bore hole surfaces of differing diameters. The outer surfaces of the rings would engage the bore side walls and conform to them in case they have slight irregularities. The skirts formed by the flaring side walls 3a of the depressions 3b would cause these skirts to press axially against the side walls 6 of the two grooves so that the lip seals would function effectively. The exact design of these lip seals may be in accord with the seal art in general, the bead seal shown being ordinarily adequate. Both rings would be pressed outwardly by the same air pressure and, therefore, uniformly contact the bore sides of the product to be picked up.

For release, the pressure of the fluid need only to be dropped to atmospheric pressure, the circumferentially stretched seals 3 then by their resilience automatically contracting and returning fully within the two grooves, it being understood that the two cylindrical parts 1a and 1b of the pick-up body, should have diameters slightly less than the bore and counterbore of the product in question. The rings and cylindrical parts would form mutually flush exteriors.

Figure 2:
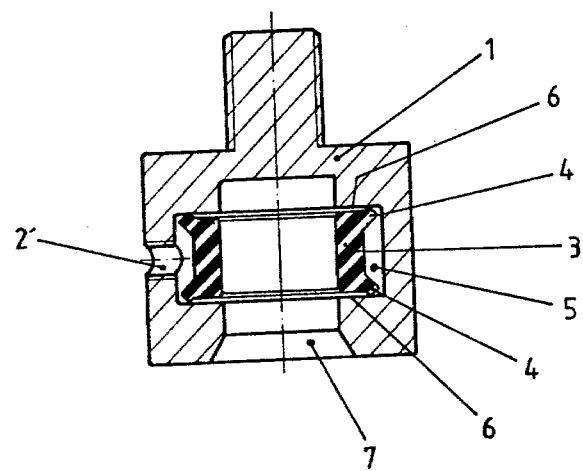
FIG. 2 in longitudinal section shows the device when adapted to grip the round periphery of a product which does not provide a bore hole for use of the device, such as a crystal drinking glass having a thin wall.

In FIG. 2, intended for external application to a product having an externally round portion, the metal body 1' has a generally tubular cylindrical contour with the pressurized fluid conduit 2' extending radially through its side wall so as to get to the exterior of the ring 3'. In this case the construction generally corresponds to that of FIG. 1 and is correspondingly numeraled with the numerals primed. The difference is that in this case it is the inside of the ring that does the gripping, the part 1' having a passage 7 in which the round part of the product is inserted. Excepting for the reversal of radial direction, the operation of this FIG. 2 form is the same as described in connection with the FIG. 1 example.

In both cases, the rounded portion of the product is gripped uniformly and the gripping action can be very firm as required for heavier products or gentle and delicate when the product is fragile. The elastic flexibility of the elastomer ring or rings, together with the possibility of making the ring wall thickness relatively thin because of the greater wall thickness provided at the top and bottom of each ring providing radial stiffening at those locations, permits the major portion of each ring to easily elastically deform when pressed outwardly or inwardly as the case may be, so as to conform to the exact shape of the round part being engaged. A firm grip results in all cases.

In each instance both the groove sides and the ring ends are flat surfaces and are mutually parallel, and these surfaces fit each other loosely. The beads contact the groove sides with an adequate pressure when the fluid pressure causes radial expansion of the ring skirts formed between the bevels 3a and the cylindrical ring outside at the sides of the rings facing the fluid pressure. The bead contact pressure reduces when the fluid pressure is terminated, facilitating removal of the ring from the groove by radially stretching or compressing the ring as the case may be. When relaxed, the ring can be flush with the metal part providing the ring groove, for easy application to and removal from the round portion of the product.

What is claimed is:

1. A device for picking up a product having a round portion, the device comprising a pick-up body having a cylindrical part adapted to be positioned radially opposite to said portion, said part having at least one circumferential groove positioned to radially face the portion, the groove having substantially flat and mutually parallel sides, a cylindrical elastomer ring positioned loosely in the groove and having axially extending lip seals slidably engaging said sides and means for introducing pressurized fluid to the groove behind said ring so as to cause the ring to move towards and frictionally grip said portion of the product to be picked up.

2. The device of claim 1 in which said ring has flat mutually parallel axial ends loosely fitting the groove's said sides and the ring's side facing the groove's bottom is formed with a depression having sides flaring towards the bottom, said lip seals extending from the ring's ends at positions axially opposite to the depression's said sides.

3. The device of claim 2 in which the bottom of said depression is flat and has an axial extent of at least 50% of the ring's axial length.

4. The device of claim 3 in which said ring has an axial length of from 0.8 to 3 times the radial wall thickness of the ring between said flat bottom and the ring's opposite side.

5. The device of claim 4 in which said ring has an elastic deformability permitting it to be deformed by force so as to be removed from said groove for replacement.

* * * * *